(12) United States Patent
Gladkikh et al.

(10) Patent No.: US 12,393,172 B2
(45) Date of Patent: Aug. 19, 2025

(54) IDENTIFYING CANDIDATE OBJECTS FOR ADDITIVE MANUFACTURING

(71) Applicants: Mikhail Nikolaevich Gladkikh, Shenandoah, TX (US); Mackenzie Dreese, Houston, TX (US); Jayesh Jain, The Woodlands, TX (US); Murali Kalyan Chamarthy, Katy, TX (US); Muhammad Faisal Iqbal, Sugar Land, TX (US)

(72) Inventors: Mikhail Nikolaevich Gladkikh, Shenandoah, TX (US); Mackenzie Dreese, Houston, TX (US); Jayesh Jain, The Woodlands, TX (US); Murali Kalyan Chamarthy, Katy, TX (US); Muhammad Faisal Iqbal, Sugar Land, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 1026 days.

(21) Appl. No.: 17/373,319

(22) Filed: Jul. 12, 2021

(65) Prior Publication Data

US 2022/0050438 A1 Feb. 17, 2022

Related U.S. Application Data

(60) Provisional application No. 63/064,622, filed on Aug. 12, 2020.

(51) Int. Cl.
*G05B 19/4099* (2006.01)
*B33Y 50/00* (2015.01)
(Continued)

(52) U.S. Cl.
CPC .......... *G05B 19/4099* (2013.01); *B33Y 50/00* (2014.12); *G06F 18/2113* (2023.01);
(Continued)

(58) Field of Classification Search
CPC .......... G06N 3/09; G06N 3/047; G06N 20/00; G05B 19/4099; G06F 18/2113
See application file for complete search history.

(56) References Cited

U.S. PATENT DOCUMENTS 10,061,300 B1 * 8/2018 Coffman .................. G06N 7/01
2015/0186418 A1 7/2015 Harp et al.
(Continued)

FOREIGN PATENT DOCUMENTS

EP 3674983 A1 7/2020
GB 2572327 A * 9/2019 .......... B29C 64/386
(Continued)

OTHER PUBLICATIONS

Tianxiang Lu, Towards a Fully Automated 3D Printability Checker, 2016 IEEE International Conference on Industrial Technology, pp. 922-927, doi: 10.1109, 922-927. (Year: 2016).*
(Continued)

*Primary Examiner* — David Yi
*Assistant Examiner* — Evan Lehrer
(74) *Attorney, Agent, or Firm* — CANTOR COLBURN LLP (57) ABSTRACT

Examples described herein provide a computer-implemented method that includes aggregating data. The method further includes filtering the data to eliminate objects known not to be suitable for additive manufacturing. The method further includes performing machine learning on the data to identify objects suitable for additive manufacturing. The method further includes generating, using additive manu-
(Continued)

facturing, at least one of the objects identified as being suitable for additive manufacturing.

15 Claims, 4 Drawing Sheets

(51) Int. Cl.
    *G06F 18/2113*     (2023.01)
    *G06N 3/047*     (2023.01)
    *G06N 3/09*     (2023.01)
    *G06N 20/00*     (2019.01)

(52) U.S. Cl.
    CPC .............. *G06N 3/047* (2023.01); *G06N 3/09* (2023.01); *G06N 20/00* (2019.01)

(56) References Cited

U.S. PATENT DOCUMENTS

| | | | |
|---|---|---|---|
| 2018/0120815 A1 | 5/2018 | Schwartz et al. | |
| 2018/0341248 A1* | 11/2018 | Mehr | G06N 20/10 |
| 2020/0257933 A1* | 8/2020 | Steingrimsson | B22F 5/04 |

FOREIGN PATENT DOCUMENTS

| | | | |
|---|---|---|---|
| WO | 2018127827 A1 | 7/2018 | |
| WO | 2019180466 A1 | 9/2019 | |

OTHER PUBLICATIONS

Robin Burke, Hybrid Recommender Systems: Survey and Experiments, User Modeling and User-Adapted Interaction 12: 331-370., 331-343. (Year: 2002).*

Callum OReilly, Russian R&D, Hydrocarbon Engineering. (Year: 2020).*

Lovatt, A.M., et al. Manufacturing process selection in engineering design. Part 2: a methodology for creating task-based process selection procedures, Materials and Design 19 (1998), pp. 217-229 (Year: 1998).*

Yang, S., et al. Towards an Automated Decision Support System for Identification of Additive Manufacturing Part Candidates. Journal of Intelligent Manufacturing, 10.1007 (Year: 2020).*

Isinkaye, F., et al. Recommendation systems: Principles, methods and evaluation. Egyptian Information Journal, Cairo University, 16, 261-273. (Year: 2015).*

Ghiasian, S.E., et al., "From Conventional to Additive Manufacturing: Determining Component Fabrication Feasibility," Proceedings of ASME 2018 Conference (Aug. 26-29, 2018), 1-16 (Year: 2018).*

Daniel, et al. (Aug. 8, 2019), "Automated Candidate Detection for Additive Manufacturing: A Framework Proposal" vol. 1, Is. 1, pp. 679-688. (Year: 2019).*

International Search Report Issued in International Application No. PCT/US2021/071141 mailed Dec. 3, 2021; 4 Pages.

Written Opinion Issued in International Application No. PCT/US2021/071141 mailed Dec. 3, 2021; 6 Pages.

* cited by examiner

IDENTIFYING CANDIDATE OBJECTS FOR ADDITIVE MANUFACTURING

CROSS-REFERENCE TO RELATED APPLICATIONS

This application claims the benefit of U.S. Provisional Patent Application No. 63/064,622 filed Aug. 12, 2020, the disclosure of which is incorporated herein by reference in its entirety.

BACKGROUND

Embodiments described herein relate generally to additive manufacturing and more particularly to techniques for identifying candidate objects for additive manufacturing.

Additive manufacturing in the process by which a three-dimensional object is generated by depositing materials successively to layers. Various industries utilize additive manufacturing to generate objects. Such industries can include aerospace, automotive, consumer goods, medical devices, oil and gas exploration and production, and the like. Downhole exploration and production efforts involve the deployment of a variety of sensors and tools into the earth to locate and extract hydrocarbons. Additive manufacturing can be useful to create components of tools, or entire tools, used in downhole exploration and production efforts.

SUMMARY

Embodiments of the present invention are directed to identifying candidate objects for additive manufacturing.

A non-limiting example computer-implemented method includes aggregating data. The method further includes filtering the data to eliminate objects known not to be suitable for additive manufacturing. The method further includes performing machine learning on the data to identify objects suitable for additive manufacturing. The method further includes generating, using additive manufacturing, at least one of the objects identified as being suitable for additive manufacturing.

A non-limiting example system includes a processing system comprising a memory and a processor, the processing system for executing the computer readable instructions, the computer readable instructions controlling the processing device to perform operations. The operations include aggregating data. The operations further include filtering the data to eliminate objects known not to be suitable for additive manufacturing. The operations further include performing, based at least in part on the filtering, machine learning on the data to identify objects suitable for additive manufacturing. The operations further include generating, using additive manufacturing, at least one of the objects identified as being suitable for additive manufacturing.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures.

DETAILED DESCRIPTION

Additive manufacturing (sometimes referred to as "3D printing") includes various manufacturing techniques (modalities) that allow "growing" an object from feedstock (e.g., powder, wire, filament, etc.) layer-by-layer into a desired shape rather than removing material from bar stock as in non-additive (i.e., subtractive) manufacturing approaches. The main advantages of additive manufacturing are relative simplicity of the manufacturing process (e.g., less steps, most of the process is happening within a single machine, no operator running the machine, etc.) and freedom of design (i.e., complex shapes can be created).

Traditionally, existing production objects have been designed for subtractive manufacturing, not additive manufacturing. The benefits of printing the same object "as is" are minimal (if any), and re-design effort is usually needed to take advantage of additive manufacturing benefits (on both object and sub-assembly level). The process of identifying and selecting objects and/or sub-assemblies suitable for additive manufacturing is manual, complex, and ad-hoc. It is therefore desirable to provide a systematic, holistic additive manufacturing approach that provides the capability of analyzing objects in batch mode rather than relying on manual expert spotting opportunities one-at-a-time. Such an approach will dramatically increase adoption of additive manufacturing, thus taking advantage of benefits associated with additive manufacturing.

Accordingly, one or more embodiments are described herein for identifying candidate objects for additive manufacturing. As an example, a holistic approach for identifying candidate objects for additive manufacturing is provided that utilizes data and information from various business and engineering systems, including drawings, 3D models, enterprise resource planning (ERP) data, reliability data, etc. Moreover, the techniques described herein utilize novel data analytics methodologies including data cleaning, vectorization, screening/filtering, and using machine learning (e.g., a neural network algorithm) to provide probabilistic recommendations on the suitability of objects for additive manufacturing. The present techniques are therefore able to identify potential candidate objects suitable to be manufactured additively and can be applied to various objects including parts, assemblies, and products. By identifying such candidate objects and then creating them using additive manufacturing, benefits such as lead time reduction, lifecycle cost reduction, and functionality improvement can be realized. The holistic nature of the present techniques enables working directly with technical and non-technical data systems and processing information from such systems in a batch mode rather than in a tedious, manual approach of finding and assessing potential candidate objects one at a time.

Figure 1:
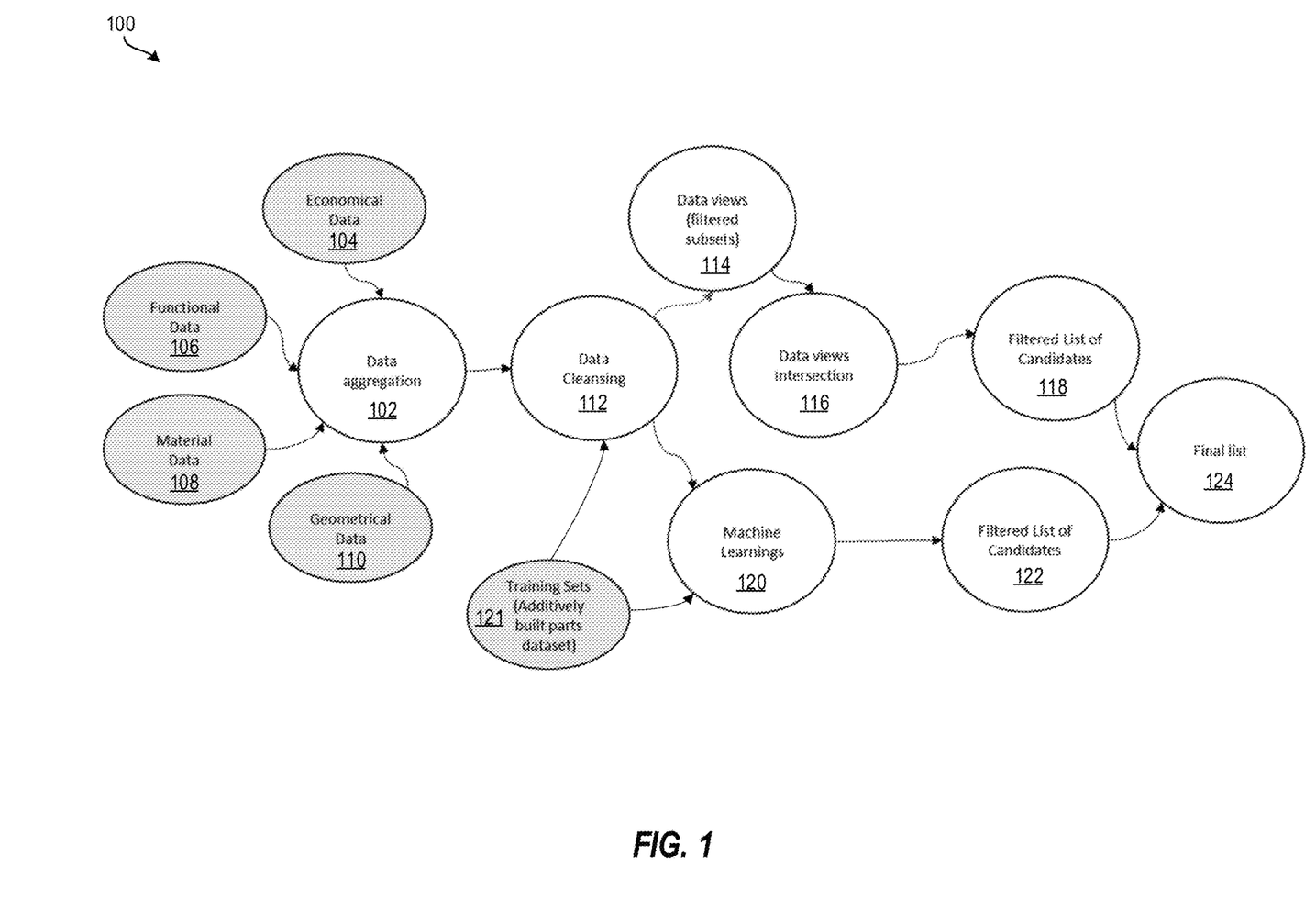
FIG. 1 depicts a bubble diagram of a method for identifying candidate objects for additive manufacturing according to one or more embodiments described herein.

FIG. 1 depicts a bubble diagram of a method 100 for identifying candidate objects for additive manufacturing according to one or more embodiments described herein.

At bubble 102, data aggregation is performed. This includes identifying data generated by and/or stored in systems and data repositories that can be used for identifying candidate objects for additive manufacturing. Such data can include economical data 104, functional data 106, material data 108, geometrical data, 110 and the like. Once the data is aggregated at bubble 102, the data can be cleansed at bubble 112. This can include detecting and correcting inaccurate and/or corrupt data. Data cleansing at bubble 112 can also be performed on training sets from bubble 121. The training sets at bubble 121 represent an additively built parts dataset(s).

After data cleansing, the data can be filtered and machine learning can be performed. Beginning at bubble 114, filtering the data includes screening of data to filter out objects that are known a priori not to be suitable for additive manufacturing. For example, an electronic component, components made from elastomers, etc., are known not to be suitable for additive manufacturing. This occurs by providing data views that show filtered subsets of the data (bubble 114), providing data views intersections that show intersections between the various data (bubble 116) to provide a filtered list of candidate objects that are suitable for additive manufacturing (bubble 118).

Machine learning at bubble 120 can be performed concurrently, simultaneously, or separately from the filtering. Performing machine learning includes training an algorithm (e.g., a neural network) on a dataset of known objects (and/or sub-assemblies) (e.g., using the training sets from bubble 121) for which the suitability for additive manufacturing is known and can be described and linked to certain dataset features. Then a trained algorithm can generate a filtered list of candidate objects at bubble 122 that are suitable for additive manufacturing.

The two filtered lists of candidate objects from bubbles 118 and 122 can be combined, at bubble 124, to form a final list of candidate objects that are suitable for additive manufacturing.

Figure 2:
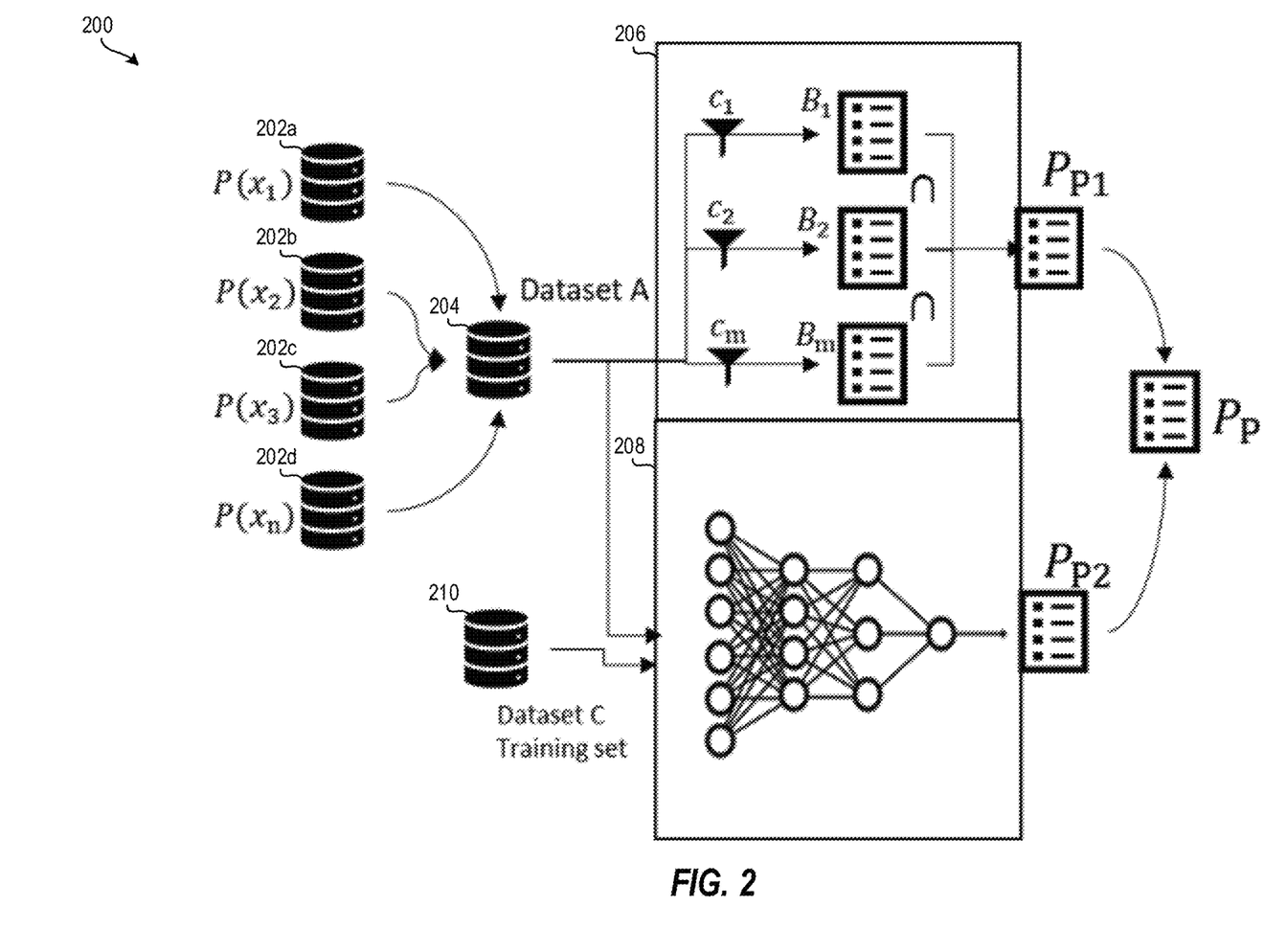
FIG. 2 depicts a block diagram of a system for identifying candidate objects for additive manufacturing according to one or more embodiments described herein.

FIG. 2 depicts a block diagram of a system 200 for identifying candidate objects for additive manufacturing according to one or more embodiments described herein. The system 200 performs filtering to generate a first output $P_{P1}$ of candidate objects that are suitable for additive manufacturing and a second output $P_{P2}$ of candidate objects that are suitable for additive manufacturing.

The system 200 aggregates data into a dataset A stored in data repository 204 from datasets 202a, 202b, 202c, 202d. The datasets 202a, 202b, 202c, 202d can include and store economical data 104, functional data 106, material data 108, geometrical data, 110 and the like. Other types of data can include business data, engineering data, manufacturing data, quality data, reliability data, operational data, etc. Block 206 of the system 200 performs filtering of the dataset A to generate a first (filtered) output $P_{P1}$ of candidate objects that are suitable for additive manufacturing.

At block 208, the system 200 performs a machine learning analysis on a training dataset C stored in a data repository 210 and/or on the dataset A stored in the data repository 204. The machine learning correlates features of objects to each other to identify suitable objects for additive manufacturing. The machine learning at block 208 generates a second output $P_{P2}$ of candidate objects that are suitable for additive manufacturing.

The first output $P_{P1}$ of candidate objects and the second output $P_{P2}$ of candidate objects can be cross validated to provide a master list $P_P$ of candidate objects suitable for additive manufacturing. For example, objects that appear on both the first output $P_{P1}$ and the second output $P_{P2}$ (i.e., $P_{P1} \cup P_{P2}$) can be said to be suitable for additive manufacturing while objects that appear in only one of the outputs $P_{P1}$ or $P_{P2}$ (or none of the outputs) are not considered suitable for additive manufacturing. The features and functionality of the system 200 are now described in more detail with respect to FIG. 3.

Figure 3:
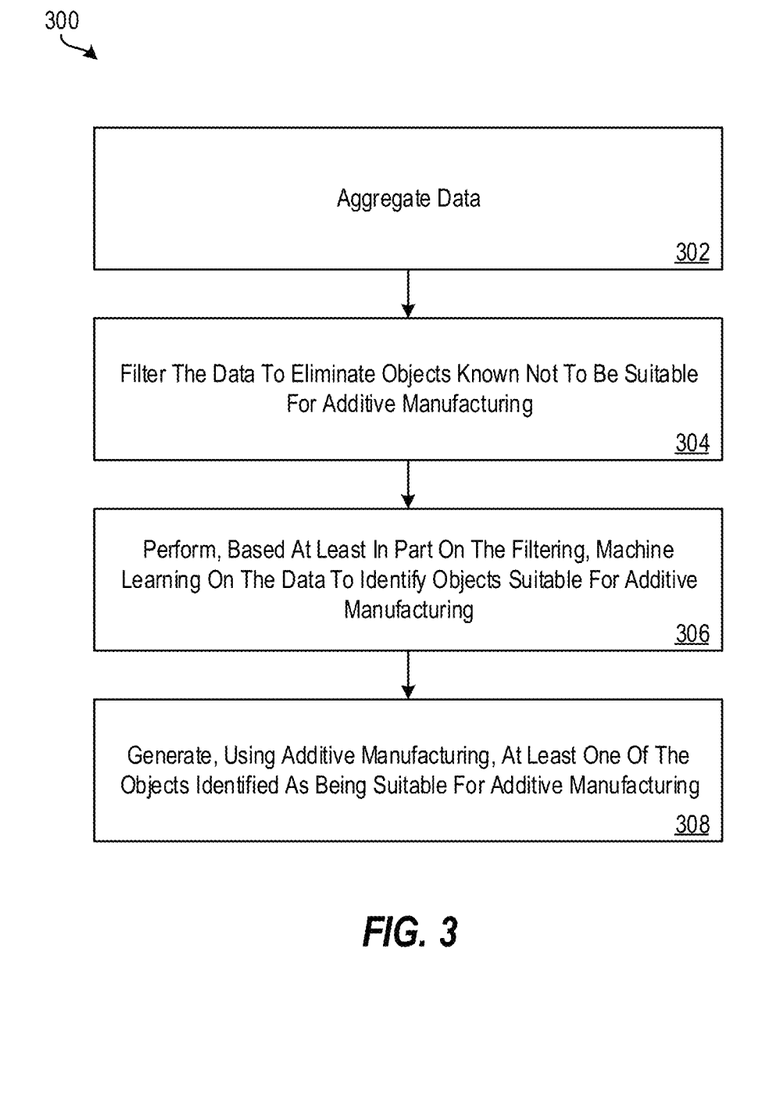
FIG. 3 depicts a flow diagram of a method 300 for identifying candidate objects for additive manufacturing according to one or more embodiments described herein.

In particular, FIG. 3 depicts a flow diagram of a method 300 for identifying candidate objects for additive manufacturing according to one or more embodiments described herein. The method 300 can be performed by any suitable processing system (e.g., the processing system 200 of FIG. 4), any suitable processing device (e.g., one of the processors 421 of FIG. 4), and/or combinations thereof or the like or another suitable system or device.

At block 302, the system 200 aggregates data. In some examples, aggregating data includes aggregating data from a plurality of data sets. This includes identifying systems and data repositories where data is stored that can be used to identify candidate objects for additive manufacturing. Such data can include economical data 104, functional data 106, material data 108, geometrical data, 110 and the like. Once the data is aggregated at bubble 102, the data can be cleansed at bubble 112. This can include detecting and correcting inaccurate and/or corrupt data. Other types of data can include business data, engineering data, manufacturing data, quality data, reliability data, operational data, etc.

With reference to FIG. 2, the dataset A is defined as {P1, P2, P3, Pn}, where P1 to Pn are an inventory/list of objects, n being the number of objects within the dataset A. Parts P has X set of features and characteristics, P (x), where:

$P(x_1)$; where $x_1$ is set of economical features of the object P $P(x_2)$; where $x_2$ is set of geometrical features of the object P $P(x_3)$; where $x_3$ is set of functional features of the object P $P(x_4)$; where $x_4$ is set of material features of the object P $P(x_s)$; where $x_s$ is set of n specific features of the object P.

An example set of features is provided in the following table. Such example is merely exemplary and is not intended to be inclusive.

| Economical ($x_1$) | Geometrical ($x_2$) | Functional ($x_3$) | Material ($x_4$) |
|---|---|---|---|
| Cost | Volume | Pressure | Type |
| Lead Time | Mass | Temperature | |
| Quantity | Bounding Box (X, Y, Z) | Corrosion | |
| Order Value | Surface Area | | |
| Service Area | Density | | |

For example, the system 200, at block 206 of FIG. 2, aggregates the X set of features as follows: Aggregation of $X=(x_1 \cup x_2 \cup x_3 \cup x_4 \cup x_n)$. With continued reference to FIG. 3, at block 304, the system 200 filters the data to eliminate objects known not to be suitable for additive manufacturing. Applying a criterion set of $c_m$, where c is a subset of X that results in dataset view B ⊆ A. Examples of such criteria are provided in the following table with corresponding logic used for filtering:

| Criteria ($c_m$) | Logic |
| --- | --- |
| C1 | Cost > $$$ AND Lead Time > 6 months AND Temperature < 100 AND Type > Steel |
| C2 | Cost < $$ AN Lead Time > 12 months AN Envelope < 8 cuft AND TYPE > Steel |

Using multiple m numbers of criteria set c results in datasets B, whereas $B_1 \rightarrow B_m$ sets are all subsets of A. The intersection of datasets $(B_1 \cap B_2 \cap B_m) \subseteq A$ results in a first (filtered) output $P_{P1}$ of candidate objects that are suitable for additive manufacturing.

At block 306, the system 200 performs, based at least in part on the filtering, machine learning on the data to identify objects suitable for additive manufacturing. The machine learning can be supervised learning according to one or more embodiments described herein. For example, in parallel, using the dataset C of objects already converted and built additively as the training set for the machine learning (see block 208 of FIG. 2), a neural network is built that can be applied to dataset A. To do this, the machine learning correlates features of objects to each other to identify suitable objects for additive manufacturing. The training set can include data for objects previously indicated as suitable for additive manufacturing and objects previously indicated as unsuitable for additive manufacturing. The machine learning outputs a second output $P_{P2}$ of candidate objects that are suitable for additive manufacturing. It should be appreciated that subject matter experts (e.g., additive manufacturing design engineers and/or process engineers) may have expertise to judge which objects are suitable or unsuitable for additive manufacturing and how to re-design an object that is unsuitable to make it suitable for additive manufacturing. The training set (e.g., at bubble 121 of FIG. 1) could be augmented by a library of objects created by subject matter experts capturing their knowledge and experience regarding suitable and unsuitable objects for additive manufacturing. This could include various idealized patterns and/or shapes that may or may not have been created using additive manufacturing in the past.

Aspects described herein can utilize machine learning functionality to accomplish the various operations described herein. More specifically, the present techniques can incorporate and utilize rule-based decision making and artificial intelligence (AI) reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs (e.g., features of objects) and outputs (e.g., objects suitable for additive manufacturing) that are currently unknown, and the resulting machine learning model can be used to determine suitability for additive manufacturing. In one or more embodiments, machine learning functionality can be implemented using a predictive neural network (PNN) having the capability to be trained to perform a currently unknown function. In machine learning and cognitive science, PNNs are a family of statistical learning models inspired by the biological neural networks of animals, and in particular the brain. PNNs can be used to predict outcomes based on a large number of inputs. Convolutional neural networks (CNN) are a class of deep, feed-forward artificial neural networks that are particularly useful at analyzing visual imagery.

PNNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in PNNs that carry electronic messages between simulated neurons are provided with numeric weights that correspond to the strength or weakness of a given connection. The weights can be adjusted and tuned based on experience, making PNNs adaptive to inputs and capable of learning. For example, a PNN for cardiovascular disease prediction is defined by a set of input neurons that can be activated by patient data. After being weighted and transformed by a function determined by the networks designer, the activation of these input neurons are then passed to other downstream neurons, which are often referred to as "hidden" neurons. This process is repeated until an output neuron is activated. The activated output neuron predicts whether a patient has (or may have a risk of) cardiovascular disease. In the present case, features of objects can be input into a PNN, and the PNN can predict whether the objects are suitable for additive manufacturing.

At block 308, the system 200 or another suitable system, causes at least one of the objects identified as being suitable for additive manufacturing to be manufactured using additive manufacturing. Any suitable technique can be utilized to additively manufacture the objects identified as being suitable for additive manufacturing. Additive manufacturing techniques are thereby improved by enabling parts to be identified for additive manufacturing that might otherwise not be identified as being suitable, and thus additive manufacturing techniques can be applied to such objects. Additive manufacturing techniques can further be improved by eliminating from consideration parts not identified as suitable for additive manufacturing. This particularly improves the operation of additive manufacturing equipment by eliminating time spent trying to manufacture an object that is not suitable for additive manufacturing, for example.

Additional processes also may be included, and it should be understood that the processes depicted in FIG. 3 represent illustrations, and that other processes may be added or existing processes may be removed, modified, or rearranged without departing from the scope of the present disclosure. In some examples, one or more of the blocks of the method 300 can be performed simultaneously or concurrently, such as performing the filtering (block 304) and performing the machine learning (block 306).

Figure 4:
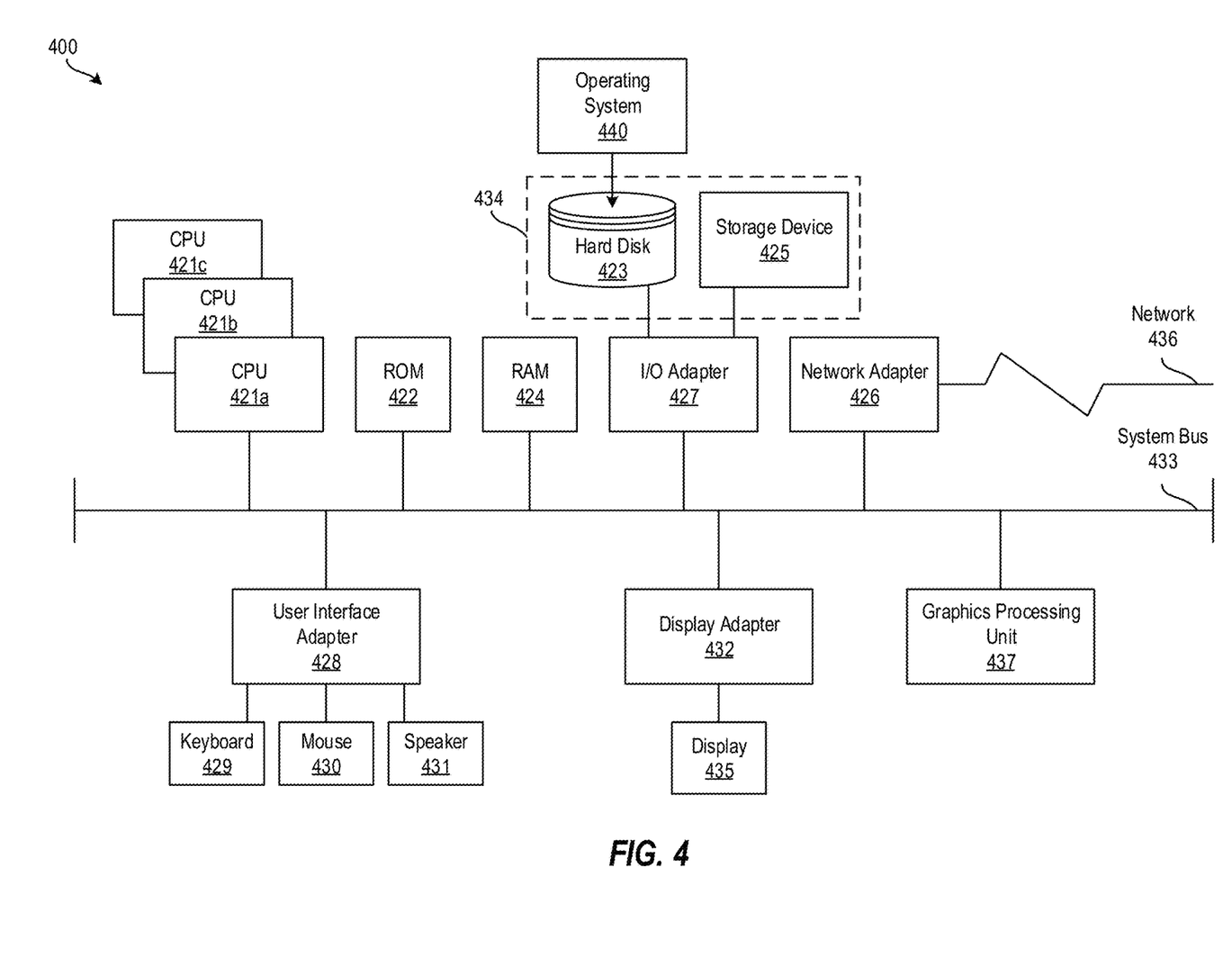
FIG. 4 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 4 depicts a block diagram of a processing system 400 for implementing the techniques described herein. In examples, processing system 400 has one or more central processing units ("processors" or "processing resources") 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of processing system 400.

Further depicted are an input/output (I/O) adapter 427 and a network adapter 426 coupled to system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. A keyboard 429, mouse 430, and speaker 431 may be interconnected to system bus 433 via user interface adapter 428, which may include, for example, a Super I/O chip integrating multiple device adapters into a single integrated circuit.

In some aspects of the present disclosure, processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing, and has a highly parallel structure that makes it more effective than general-purpose CPUs for algorithms where processing of large blocks of data is done in parallel.

Thus, as configured herein, processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in processing system 400.

Example embodiments of the disclosure include or yield various technical features, technical effects, and/or improvements to technology. Example embodiments of the disclosure provide technical solutions for identifying candidate objects for additive manufacturing. These technical solutions provide the ability for very large and separate data sets to be aggregated and analyzed (using the filtering and/or machine learning techniques described herein) to identify candidate objects for additive manufacturing. Accordingly, the present techniques improve additive manufacturing by eliminating objects from manufacturing that are not suitable for additive manufacturing.

Set forth below are some embodiments of the foregoing disclosure:

Embodiment 1: A method comprising: aggregating data; filtering the data to eliminate objects known not to be suitable for additive manufacturing; performing machine learning on the data to identify objects suitable for additive manufacturing; and generating, using additive manufacturing, at least one of the objects identified as being suitable for additive manufacturing.

Embodiment 2: A method according to any prior embodiment, further comprising, subsequent to aggregating the data, cleaning the data.

Embodiment 3: A method according to any prior embodiment, wherein the machine learning comprises a predictive neural network.

Embodiment 4: A method according to any prior embodiment, wherein performing the machine learning comprises applying a machine learning model, the method further comprising training the machine learning model on a training data set.

Embodiment 5: A method according to any prior embodiment, wherein the data comprises features.

Embodiment 6: A method according to any prior embodiment, wherein the features comprise economical features, geometrical features, functional features, and material features.

Embodiment 7: A method according to any prior embodiment, wherein the filtering the data generates a first output of candidate objects and wherein the performing the machine learning generates a second output of candidate objects.

Embodiment 8: A method according to any prior embodiment, further comprising cross validating the first output of candidate objects and the second output of candidate objects to generate a master list of candidate objects suitable for additive manufacturing.

Embodiment 9: A method according to any prior embodiment, wherein the at least one of the objects identified as being suitable for additive manufacturing is selected from the master list of candidate objects suitable for additive manufacturing.

Embodiment 10: A method according to any prior embodiment, wherein the machine learning is a supervised machine learning.

Embodiment 11: A method according to any prior embodiment, wherein aggregating the data comprises aggregating data from a plurality of data sets.

Embodiment 12: A processing system comprising a memory and a processor, the processing system for executing the computer readable instructions, the computer readable instructions controlling the processing device to perform operations comprising: aggregating data; filtering the data to eliminate objects known not to be suitable for additive manufacturing; performing, based at least in part on the filtering, machine learning on the data to identify objects suitable for additive manufacturing; and generating, using additive manufacturing, at least one of the objects identified as being suitable for additive manufacturing.

Embodiment 13: A system according to any prior embodiment, wherein the machine learning comprises a predictive neural network.

Embodiment 14: A system according to any prior embodiment, wherein performing the machine learning comprises applying a machine learning model, the method further comprising training the machine learning model on a training data set.

Embodiment 15: A system according to any prior embodiment, wherein the filtering the data generates a first output of candidate objects and wherein the performing the machine learning generates a second output of candidate objects.

Embodiment 16: A system according to any prior embodiment, wherein the operations further comprises cross validating the first output of candidate objects and the second output of candidate objects to generate a master list of candidate objects suitable for additive manufacturing, wherein the at least one of the objects identified as being suitable for additive manufacturing is selected from the master list of candidate objects suitable for additive manufacturing.

Embodiment 17: A system according to any prior embodiment, wherein the at least one of the objects identified as being suitable for additive manufacturing is an object used during oil and gas exploration and production.

Embodiment 18: A system according to any prior embodiment, wherein aggregating the data comprises aggregating data from a plurality of data sets.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method comprising:
   aggregating first data comprising objects and features associated with the objects, wherein the features comprise:
   economical features comprising cost, manufacturing lead time, quantity, order value, and service area associated with the objects;
   geometrical features comprising volume, mass, bounding boxes, surface area, and density associated with the objects;
   functional features comprising pressure, temperature, and corrosion associated with the objects; and
   material features comprising material type associated with the objects;
   filtering the first data by applying a processing analysis which analyzes the objects comprised in the first data according to a batch mode for analyzing batches of objects, wherein the filtering is based on one or more target economical features included among the economical features, one or more target functional features included among the functional features, and a target material type;
   identifying, based on the filtering, a first set of candidate objects for which additive manufacturing of the first set of candidate objects:
   satisfies the one or more target economical features,
   provides, for each of the first set of candidate objects, the one or more target functional features, and
   includes using a target material type;
   performing machine learning analysis on the first data, by providing the first data to a machine learning model trained on second data different from the first data, to generate a probabilistic recommendation comprising, from among the objects comprised in the first data, a second set of candidate objects for additive manufacturing;
   determining, based on the first set of candidate objects and the second set of candidate objects, a master list of candidate objects for additive manufacturing, wherein determining the master list comprises including objects which are included in both the first set of candidate objects and the second set of candidate objects; and
   generating, using additive manufacturing, at least one object comprised in the master list of candidate objects for additive manufacturing.

2. The method of claim 1, further comprising, subsequent to aggregating the first data, cleaning the first data.

3. The method of claim 1, wherein the machine learning analysis is performed by a predictive neural network.

4. The method of claim 1, wherein;
   performing the machine learning analysis comprises applying a machine learning model, and
   the method further comprises training the machine learning model on the second data, wherein the second data is a training data set comprising a set of reference objects previously manufactured using the additive manufacturing, wherein the set of reference objects are comprised in a tool used with respect to oil and gas exploration and production.

5. The method of claim 1, wherein the filtering the first data comprises eliminating objects for which additive manufacturing of the eliminated objects:
   fails to satisfy the one or more target economical features,
   fails to provide the one or more target functional features, or
   fails to use the target material type.

6. The method of claim 1, wherein:
   determining the master list of candidate objects comprises cross validating the first set of candidate objects with respect to the second set of candidate objects to generate the master list of candidate objects.

7. The method of claim 1, wherein the machine learning model is trained using supervised machine learning.

8. The method of claim 1, wherein aggregating the first data comprises aggregating the first data from a plurality of data sets.

9. A system comprising:
   a processing system comprising a memory and a processor, the processing system for executing computer readable instructions, the computer readable instructions controlling the processor to perform operations comprising:

aggregating first data comprising objects and features associated with the objects, wherein the features comprise:
   economical features comprising cost, manufacturing lead time, quantity, order value, and service area associated with the objects;
   geometrical features comprising volume, mass, bounding boxes, surface area, and density associated with the objects;
   functional features comprising pressure, temperature, and corrosion associated with the objects; and
   material features comprising material type associated with the objects;
filtering the first data by applying a processing analysis which analyzes the objects comprised in the first data according to a batch mode for analyzing batches of objects, wherein the filtering is based on one or more target economical features included among the economical features, one or more target functional features included among the functional features, and a target material type;
identifying, based on the filtering, a first set of candidate objects for which additive manufacturing of the first set of candidate objects:
   satisfies the one or more target economical features,
   provides, for each of the first set of candidate objects, the one or more target functional features, and
   includes using a target material type;
performing machine learning analysis on the first data, by providing the first data to a machine learning model trained on second data different from the first data, to generate a probabilistic recommendation comprising, from among the objects comprised in the first data, a second set of candidate objects for additive manufacturing;
determining, based on the first set of candidate objects and the second set of candidate objects, a master list of candidate objects for additive manufacturing, wherein determining the master list comprises including objects which are included in both the first set of candidate objects and the second set of candidate objects; and
generating, using additive manufacturing, at least one object comprised in the master list of candidate objects for additive manufacturing.

10. The system of claim 9, wherein the machine learning analysis is performed by a predictive neural network.

11. The system of claim 9, wherein;
performing the machine learning analysis comprises applying a machine learning model, and
the operations further comprise training the machine learning model on the second data, wherein the second data is a training data set comprising a set of reference objects previously manufactured using the additive manufacturing, wherein the set of reference objects are comprised in a tool used with respect to oil and gas exploration and production.

12. The system of claim 9, wherein the filtering the first data generates a first output of candidate objects and wherein the performing the machine learning analysis generates a second output of candidate objects.

13. The system of claim 9, wherein determining the master list of candidate objects comprises cross validating the first set of candidate objects with respect to the second set of candidate objects to generate the master list of candidate objects for additive manufacturing.

14. The system of claim 9, wherein the first set of candidate objects, the second set of candidate objects, and the master list of candidate objects are objects comprised in a tool used with respect to oil and gas exploration and production.

15. The system of claim 9, wherein aggregating the first data comprises aggregating the first data from a plurality of data sets.

* * * * *